United States Patent [19]

Newell

[11] 4,027,221

[45] May 31, 1977

[54] CONTROL CIRCUIT WITH TIME DELAY

[75] Inventor: Dennis E. Newell, El Segundo, Calif.

[73] Assignee: Robertshaw Controls Company, Richmond, Va.

[22] Filed: Feb. 11, 1975

[21] Appl. No.: 549,125

[52] U.S. Cl. .................................. 318/484; 361/29
[51] Int. Cl.[2] ................................ H02H 7/085
[58] Field of Search ............. 317/13 A, 22, 141 S, 317/36 TD; 318/484

[56] References Cited
UNITED STATES PATENTS

| | | | |
|---|---|---|---|
| 3,302,062 | 1/1967 | Craig | 317/22 |
| 3,660,718 | 5/1972 | Pinckaers | 317/13 B |
| 3,742,302 | 6/1973 | Neill | 317/13 R |
| 3,742,303 | 6/1973 | Dageford | 317/13 R |
| 3,753,043 | 8/1973 | Plouffe | 317/13 A |
| 3,774,082 | 11/1973 | Chang | 317/141 S |
| 3,796,918 | 3/1974 | DeForest | 317/13 A |
| 3,814,991 | 6/1974 | Hewitt | 317/141 S |

*Primary Examiner*—Robert K. Schaefer
*Assistant Examiner*—John J. Feldhaus
*Attorney, Agent, or Firm*—O'Brien & Marks

[57] ABSTRACT

A control circuit, such as a motor control circuit, includes a capacitance connected at one side with a timing resistance to the gate of a field effect transistor (FET) which inhibits energization of a load, such as a motor. The FED controls a semiconductor switch which is connected by a diode to the other side of the capacitance to prevent reactuation of the circuit during a time delay determined by the rate of current flow through a timing resistance to the one side of the capacitance.

11 Claims, 3 Drawing Figures

CONTROL CIRCUIT WITH TIME DELAY

BACKGROUND OF THE INVENTION

1. Field of the Invention

The invention relates to control circuits and more particularly to control circuits for preventing reactuation of a load device for a preselectable time following either a deactuation of the load or a power failure. Such control circuits are often necessary in apparatus controlling large electric motors, like air conditioning compressor motors, for example, and other equipment that can be damaged if turned off and then on again in too short a time period.

2. Description of the Prior Art

The prior art, as exemplified by U.S. Pat. Nos. 3,619,668; 3,660,718; 3,721,832; 3,742,303; 3,774,082; 3,794,858; and 3,814,991, contains control circuits for delaying restart of load devices, such as motors, after shutdown; such control circuits generally have one or more deficiencies, such as being unduly complex and expensive, being unreliable, being difficult to incorporate with other controls such as motor winding and oil pressure sensing controls, and utilizing relay contacts which add resistance and unreliability to the circuit.

SUMMARY OF THE INVENTION

The invention is summarized in that a control circuit to prevent reenergization of a load for a predetermined time includes means including a first semiconductor switching device for controlling energization of the load, a second semiconductor switching device having conductive, and non-conductive states and connected to control the first switching device to deenergize the load when the second device is conductive, a field effect transistor connected to control the operation of the second switching device, a circuit junction, a capacitor having a first side connected to the gate of the field effect transistor and a second side connected to the circuit junction, a resistance connected across the capacitor, means connected to the circuit junction for lowering the voltage at the circuit junction to turn off the field effect transistor, and means connected between the circuit junction and the second switching device for holding the voltage at the circuit junction at a low voltage until the voltage on the first side of the capacitor is raised sufficiently to turn on the field effect transistor.

An object of the invention is to provide a control circuit with a time delay circuit for addition to a motor control circuit which prevents reenergization of a load for a preselectable time delay period after deenergization of the load.

Another object of the invention is to provide a time delay circuit for a control circuit that is inexpensive and reliable and is easy to incorporate for use with other control devices and circuits.

It is a further object of the invention to provide a time delay circuit in a control circuit that continues to operate even if no external energy is applied to the circuit.

It is yet another object of the invention to provide such a time delay circuit that is usable in a wide variety of applications with a wide selection of time values.

Other objects, advantages, and features of the invention will become apparent from the following description of the preferred embodiment taken in conjunction with the accompanying drawings.

BRIEF DESCRIPTION OF THE DRAWINGS

FIG. 3 is a circuit schematic of an alternative embodiment of a part of the circuit of FIG. 2.

DESCRIPTION OF THE PREFERRED EMBODIMENT

Figure 1:
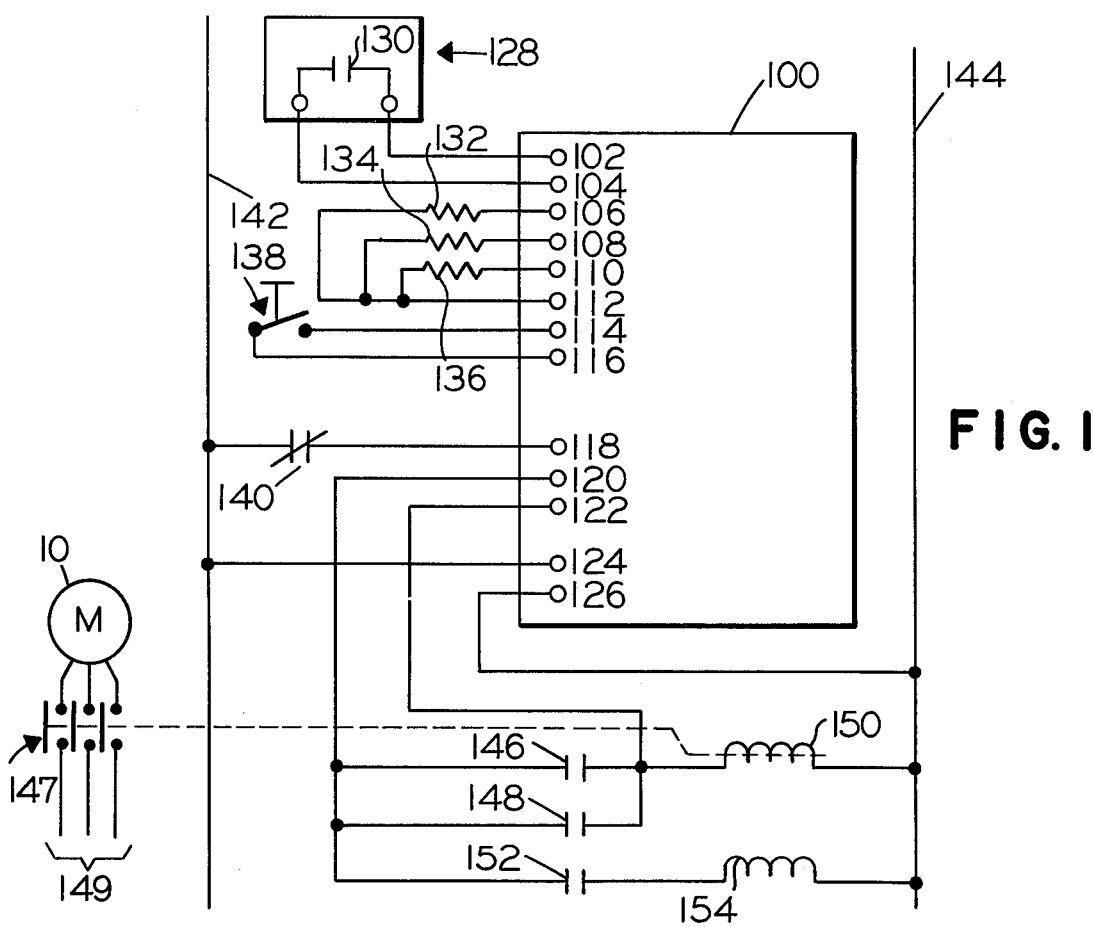
FIG. 1 is a schematic of the external connections to a motor control circuit using the time delay circuit of the present invention.

As shown in FIG. 1, the invention is embodied in a load control circuit, such as a motor protection circuit suitable for protecting a compressor motor 10 in a refrigeration system. A housing 100 has thereon a plurality of external terminals 102, 104, 106, 108, 110, 112, 114, 116, 118, 120, 122, 124, and 126. Connected between the terminals 102 and 104 is a normally open lubricating fluid or oil pressure sensing switch, indicated generally at 128, which has a pair of contacts 130 which are closed in response to a predetermind pressure in the lubricating oil of the compressor motor 10 being protected. Three thermosensing resistances 132, 134 and 136, such as lengths of positive temperature coefficient wires embedded in respective phase windings of the three phase compressor motor 10, each have one end connected to the respective terminals 106, 108, and 110 and have their other end commonly joined to the terminal 112. A normally open thermal-sensing-circuit-reset switch 138 is connected between the terminals 114 and 116. Connected to the terminal 118 is one side of a normally closed control switch 140, which may be an off/on control switch or a suitable condition responsive switch such as a refrigerant high pressure switch responsive to excessive pressure build-up in the refrigerant line. The other side of the control switch 140 is connected to an AC power line 142 which, together with a second AC power line 144, supplies power to the motor control circuit. Low pressure contacts 146, which are responsive to low refrigerant pressure in the compressor suction line, and room temperature relay contacts 148, are connected in parallel between the terminals 120 and 122. A power control relay winding 150 is connected between the terminal 122 and the AC power line 144 and controls the operation of a set of three power relay contacts 147 which connect the motor 10 to a set of three phase power lines 149. A series connection of another set of room temperature relay contacts 152 and the coil 154 of a liquid line solenoid valve is connected between the terminal 120 and the AC power line 144. The room temperature relay contacts 148 and 152 are operated by a temperature responsive device located in the chamber being cooled and serve to thermostatically control the operation of the compressor motor. The coil 154 operates the liquid line solenoid valve (not shown) which is inserted in the suction line of refrigerant to the compressor. The AC power line 142 is connected directly to the terminal 124 while the AC power line 144 connects to the terminal 126.

Figure 2:
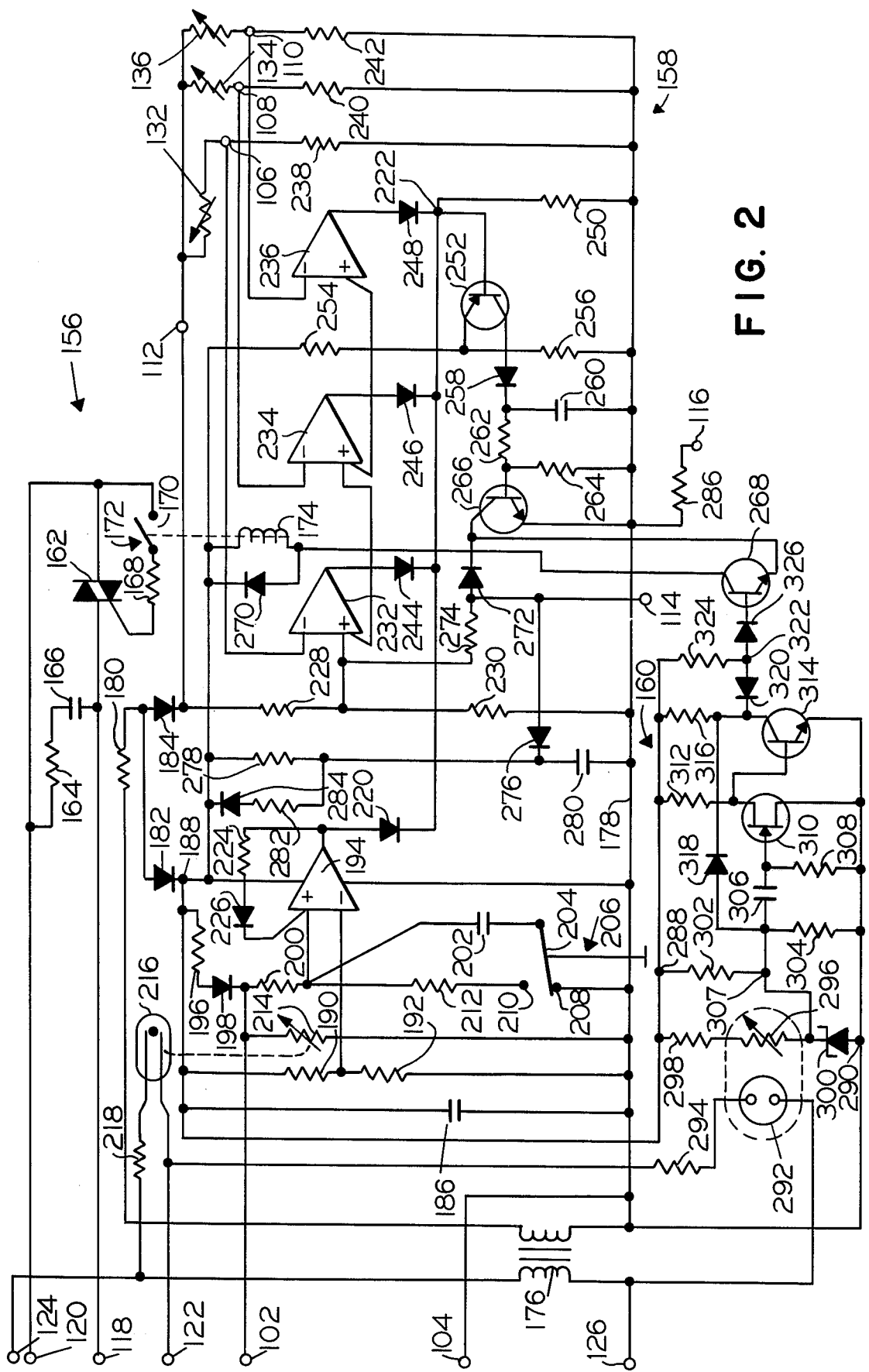
FIG. 2 is a circuit schematic of the motor control circuit of FIG. 1 and includes the time delay circuit of the present invention.

The portion of the motor protection circuit enclosed in the housing 100 includes, as shown in FIG. 2, a motor relay switching circuit, indicated generally at 156, a condition sensing and switch control circuit indicated generally at 158 and a time delay reset circuit indicated generally at 160.

In the motor relay switching circuit 156, a triac 162 is connected between the terminals 118 and 120 to control current flow in relay windings 150. Connected across the triac 162 is a series circuit of a resistor 164 and a capacitor 166 which have values selected to limit the rate of voltage rise across the triac 162 to help prevent false triggering. Connected between the terminal 120 and the control electrode of the triac 162 is the series connected resistor 168 and contacts 170 of a switching relay 172 which also includes control windings 174.

In the condition sensing and switching control circuits 158, a primary winding of a power transformer 176 is connected across the terminals 124 and 126. The secondary winding of the transformer 176 has one end connected to a ground point 178 which is connected to the terminal 104 and one end connected through a resistor 180 to the anodes of a pair of rectifier diodes 182 and 184. A filtering capacitor 186 has one plate connected to ground 178 and the other plate connected to the cathode of the diode 182 such as to create a positive filtered DC voltage node 188. A pair of resistors 190 and 192 are connected in series between the DC voltage node 188 and the ground 178 to form a resistive voltage divider. The junction between the resistors 190 and 192 is connected to the inverting input of an operational amplifier 194 which has power inputs connected to receive DC supply voltage from the node 188 and the ground 178. Also connected between the node 188 and the ground 178 is a series circuit of a voltage dropping resistance 196, a diode 198, a timing resistance 200, a timing capacitor 202, and the contact 208 and arm 204 of a single-pole double-throw manual reset switch 206. A normally open contact 210 of the reset switch 206 is connected to ground 178 and a normally open contact 210 of the switch is connected to one side of a resistance 212, the other side of which is connected to the junction of resistor 200 and capacitor 202. The non-inverting input to the amplifier 194 is also connected to the junction of resistor 200 and capacitor 202. Connected directly between the cathode of diode 198 and ground 178 is a light-sensitive resistance 214 which is arranged in proximity with a lamp 216, such that the light sensitive resistance 214 is driven into a highly conductive state when the lamp 216 is lit and is less conductive when the lamp 216 is not lit. The lamp 216 has one terminal connected through a current-limiting resistor 218 to the terminal 124 while the other terminal of the lamp is connected directly to the terminal 122. The output of the amplifier 194 is connected through a diode 220 to an OR-circuit node 222. A resistor 224 and a diode 226 are connected in series between the output and the non-inverting input of the amplifier 194 as a feedback loop.

The cathode of the diode 184 is connected to ground 178 through a resistive voltage divider of resistors 228 and 230. The junction between the resistors 228 and 230 is connected to non-inverting inputs of three operational amplifiers 232, 234, and 236. The cathode of diode 184 is also connected through the terminal 112 to the three thermosensing resistances 132, 134, and 136. The thermosensing resistances 132, 134, and 136 are connected through the respective terminals 106, 108 and 110 to one ends of fixed resistances 238, 240, and 242 which have their other ends connected to ground 178. The terminals 106, 108, 110 are also connected to the respective inverting inputs of the amplifiers 232, 234 and 236. The outputs of the amplifiers 232, 234 and 236 are connected to the respective anodes of diodes 244, 246 and 248, the cathodes of which are all joined at the node 222. The node 222 is connected through a resistance 250 to ground 178 and also to the base of a PNP transistor 252. The emitter of the transistor 252 is connected to the junction between resistors 254 and 256 forming a voltage divider connected between the node 188 and the ground 178. The collector of the transistor 252 is connected through a diode 258 to a filtering network which includes a capacitor 260 connected to ground 178 and series connected resistors 262 and 264, the resistor 264 also connected to ground 178. The junction between the resistors 262 and 264 is connected to the base of an NPN transistor 266 having an emitter connected to ground. The collector of the transistor 266 is connected serially through the emitter and collector of an NPN bipolar junction transistor 268 of the time delay reset circuit 160 to one end of the control winding 174 which has its other end connected to node 188. A diode 270 is connected across the winding 174 to protect against transients. Also connected to the collector of the transistor 266 is the cathode of a diode 272, the anode of which is connected to a resistor 274, the anode of a diode 276 and the terminal 114. The resistor 274 is connected at its other end to the junction of the voltage divider resistors 228 and 230. The cathode of the diode 276 is connected to the junction of a series timing resistance 278 and capacitance 280 connected between node 188 and ground 178. A resistor 282 and a diode 284 are connected in series across the resistor 278 with the cathode of the diode 284 being connected to the node 188. A resistor 286 is connected between the ground 178 and the terminal 116.

The time delay reset circuit 160 has a DC voltage node 288 which is connected to the node 188, and also has a ground connection 290 connected to the ground 178. A lamp 292 has one of its terminals connected through a current limiting resistor 294 to the terminal 122, and has its other terminal connected directly to the terminal 126. A light sensitive resistance 296 is located in proximity to the lamp 292 so as to produce a low resistance valve in resistor 296 when illuminated by lamp 292 and to produce a high resistance value in resistance 296 when the lamp 292 is dark. One side of the resistance 296 is connected to one side of a resistor 298 which has its other end connected to the node 288. The other side of the resistance 296 is connected to a circuit junction 307. A zener diode 300 is connected between the circuit junction 307 and the ground 290 with its cathode toward the circuit junction 307. The zener diode 300 prevents the voltage at the circuit junction from exceeding a preselectable maximum voltage, for example, 12 volts if the DC supply voltage is 24 volts. A pair of resistors 302 and 304 each has one end connected to the circuit junction 307 with the other end of the resistor 302 being connected to the node 288 and the other end of the resistor 304 being connected to the ground 290. The resistors 302 and 304 form a resistive voltage divider when the resistance 296 has a high resistance value and the resistor 302 is selected to be of a much greater value than the resistor 304, for example, 20 times greater, in order that this voltage divider tends to cause a low voltage at the circuit junction 307. Also connected to the circuit junction 307 is one side or plate of a timing capacitor 306, the other side or plate of which is connected to the gate electrode of a N-channel junction field effect transistor (FET) 310. A timing resistor 308 has one end also connected to the junction of the capacitor 306 and the gate of the FET 310 and its other connected to ground 290. The source of the FET 310 is connected to ground 290 while the drain is connected through a dropping resistance 312 to the node 288. The drain of the FET 310 is also connected to the base of an NPN bipolar junction switching transistor 314. The emitter of the transistor 314 is connected to ground 290 while its collector is connected to one end of a resistor 316 which has its other end connected to the node 288. A diode 318 has its anode connected to the circuit junction 307 and its cathode connected to the collector of the transistor 314. Also connected to the collector of the transistor 314 is the cathode of a diode 320, the anode of which is connected to a current node 322 which is connected to the DC voltage node 288 through a resistor 324. A diode 326 also has its anode connected to the current node 322 with its cathode being connected to the base of the transistor 268.

In the operation of the circuit of FIGS. 1 and 2, the triac 162 serves to control the flow of current to the power control relay windings 150. When the triac 162 is not energizing the relay, the compressor is not energized. The operation of the triac 162 is controlled by the transistor 266 which is, in turn, controlled by the voltage at the node 222. The voltage at the node 222 is responsive to the state of the four operational amplifiers 194, 232, 234, and 236 which change state in response to sensed conditions. The time delay reset circuit 160 controls the condition of the transistor 268 to inhibit reenergization of the triac 162 and restart-up of the motor for a selected time delay after any motor shut-down for any reason.

In particular, starting with FIG. 1, the triac 162 controls the current flowing out of the terminal 120. If either of pressure contacts 146 or room temperature relay contacts 148 are closed, the winding 150 is energized. If the compressor is to be shut off, the contacts 148 and 152 will open, thereby removing power from the liquid line solenoid valve windings 154. This closes a solenoid valve on the refrigerant line to the compressor. The compressor continues to operate until sufficient suction is developed in the refrigerant line to open the low pressure contacts 146, thereby removing current to windings 150 and turning off the compressor. When the room temperature relay contacts 148 and 152 again close, the compressor again starts and the liquid line solenoid valve reopens allowing refrigerant flow. If desired, the contacts 146, 148 and 152 and the liquid line solenoid can be removed and a simple set of thermostatic contacts inserted for contacts 146.

In FIG. 2, the operational amplifier 194 is responsive to the lubricating oil pressure of the compressor. The resistors 190 and 192 are selected to provide a fixed reference voltage to the inverting input of the amplifier 194 which is compared to the input to the non-inverting input to the amplifier. The non-inverting input follows an increasing exponential rising voltage as the capacitor 202 charges through the resistor 200, the resistor 196 and the diode 198 unless one of two conditions is present. If the motor is turned off, i.e., if the triac 162 is off or if the switch 140 or both of the contacts 146 and 148 are open, the lamp 216 becomes lit and resistor 214 becomes highly conductive, thereby lowering the voltage at the cathode of the diode 198 and preventing the capacitor 202 from charging to a voltage above the voltage at the inverting input to the amplifier. If the motor is turned on, the capacitor 202 starts to charge up, but under normal circumstances, before the capacitor 202 can charge up, the compressor lubricating oil pressure will build up enough that the oil pressure sensing switch contacts 130 will close, thereby connecting terminal 102 to ground 178 and preventing any further charging of the capacitor 202. If neither of these conditions occurs, i.e., the motor is energized, and the oil pressure is insufficient to close the contacts 130, the voltage across the capacitor 202 rises to exceed the voltage across the resistor 192 and the output of the amplifier 194, which is normally low or close to ground, will be driven upward in voltage. The diode 226 and resistor 224 provide latching from the output of the amplifier to 194 to the capacitor 202 to keep the capacitor 202 charged once the output of the amplifier 194 is driven high, even if the contacts 130 subsequently close or the resistance 214 is driven to its low resistance state. To reset this circuit, the reset switch 206 is depressed to disconnect the capacitor 202 from the ground 178 and cause the capacitor 202 to be discharged through the resistor 212. When the swtich 212 is released, the voltage across the capacitor 202 will initially be zero and the circuit is reset.

Similarly, each of the amplifiers 232, 234 and 236 has its non-inverting input connected to a fixed voltage provided by the voltage divider formed by the resistors 228 and 230. This is compared to the inverting inputs of the amplifiers 232, 234 and 236 which are connected to respective voltage dividers formed by the thermosensing resistance 132 and the resistor 238, the thermosensing resistance 134 and the resistor 240, and the thermosensing resistance 136 and the resistor 242. These voltage dividers provide a voltage normally above that of the voltage divider formed by the resistors 228 and 230. As the temperature in any one of the thermosensing resistances 132, 134 or 136 becomes too high and exceeds the preselected safe maximum, 121° C for example, the resistance of the thermosensing resistance rises, lowering the voltage to the inverting input of the respective amplifier 232, 234 or 236 and thereby driving the output of the amplifier from its normal low or zero state to a much higher voltage.

If the output of any of the amplifiers 194, 232, 234 or 236 is driven high, its respective diodes 220, 244, 246 and 248 become conductive and the node 222 is pulled high to provide an OR-gate function to node 222. The transistor 252 is normally conductive since the node 222 is normally low with respect to the emitter of the transistor 252 which is connected between the resistors 252 and 256, but as the node 222 is driven high, the transistor 252 is turned off. This inhibits current flow to filtering capacitor 260, which is normally charged through the transistor 252 and the resistor 254, and which not discharges through the resistor 264. When the capacitor 260 is discharged, there is no longer any base drive current for the transistor 266 and it becomes nonconductive, thereby deenergizing the solenoid winding 174 and the triac 162, and turning the motor off. Thus, a high condition on the output of any one of the amplifiers 194, 232, 234 and 236 functions to remove power from the motor.

The resistor 274 and the diode 272 allow the temperature sensing amplifiers 232, 234 and 235 to be responsive to separate temperatures depending if the motor is energized or not. If the transistor 266 is not conducting, the resistor 274 is effectively removed from the circuit and the inverting inputs of the amplifiers 232, 234 and 236 are controlled by the voltage divider of resistors 228 and 230. When the transistor 266 is conducting, the resistor 274 is imposed in the circuit parallel to resistor 230, thereby lowering the voltage at the noninverting input to the amplifiers to allow the thermosensing resistances to sense a higher temperature before any of the amplifiers drives its output high. Thus, the maximum operating temperature of the motor can be set relatively high, for example at 121° C., while motor restart can be inhibited at temperatures above a lower temperature, for example above 71° C.

If, however, it is necessary to start the motor while it is between 71° and 121° C., the thermal-sensing-circuit-reset switch 138 can be utilized. This switch 138 connects the terminal 114 to the terminal 116, thereby introducing the resistance 286 in parallel to the resistance 230 and lowering the voltage and the noninverting inputs to the amplifiers 232, 234, and 236. The resistance 286 can be selected to allow restarting of the motor if the temperature is above any corresponding temperature value between 71° and 121° C. that is deemed appropriate.

In the event of a momentary power failure, capacitor 280 discharges through the resistor 282 and diode 284. When the power is restored, the voltage across the capacitor 280 will momentarily be very low and resistor 274 will, in effect, be temporarily inserted in the circuit parallel to resistor 230 just as if the transistor 266 was conductive, thereby allowing the motor to be energized if its temperature is less than 121° C. Whether or not the motor restarts, capacitor 280 then charges through resistor 278 and the diode 276 is reverse biased, and the capacitor 280 no longer affects the operation of the circuit.

In general, the time delay reset circuit 160 functions to prevent immediate restart of the motor after shutdown. The transistor 268 which is connected between the transistor 266 and the relay coil 174 will be rendered non-conductive for a predetermined period following shutdown of the motor, whether due to high temperature, power failure, oil pressure failure, opening of the control switch 140 or opening of the room temperature relay contacts 148 and 152. The operation of the transistor 268 is controlled by the transistor 314 and the FET 310.

In particular, the lamp 292 is connected to the terminals 122 and 126 which are connected across the windings 150 of the power control relay. Thus, if the windings 150 are energized, i.e., the triac 162 is conductive and contacts 140, 146 and 148 are closed, a voltage appears across the terminals 122 and 126 and the lamp 292 is turned on. The lamp 292 being on drives the light sensitive resistance 296 into its conductive state, thereby raising the voltage at the circuit junction 307. The maximum voltage at the junction 307 is controlled by reverse breakdown voltage of the zener diode 300 which is now reverse biased. If the lamp 292 is not lit, the resistor 296 becomes highly resistive and the voltage at the junction 307 is controlled by the voltage divider of the resistors 302 and 304. The resistance of the resistor 302 is much greater than the resistance of the resistor 304 so that the junction 307 assumes a very low value if the lamp 292 is turned off.

The voltage at the junction 307 controls the voltage at one plate of the capacitor 306. During normal motor operation, the voltage at the junction 307 is high and the capacitor 306 is charged to 12 volts. The gate voltage of the FET 310 is only slightly above ground, but this is sufficient to render the FET 310 conductive when the junction 307 is high. The leakage current through the capacitor 306 is sufficient to maintain the FET 310 in its conductive state. As long as FET 310 is in its conductive state, the base of transistor 314 is held low and the transistor 314 is nonconductive causing its collector to be high and diode 320 to be reverse biased. Therefore, all current flowing through the resistor 324 flows through the diode 326 to drive the base of the transistor 268, thereby rendering the transistor 268 conductive, and allowing the transistor 266 to control the motor operation.

However, in the event that the lamp 292 is turned off, i.e., the compressor is shut down for any reason, the voltage at the junction 307 becomes low, or very close to the ground. This causes the gate of FET 310 to be driven to about −12 volts, since the capacitor 306 was previously charged to 12 volts, to render the FET 310 non-conductive, allowing the current flowing through the resistor 312 to supply base drive current to the transistor 314, thereby turning transistor 314 on. The diode 320 is forward biased and the current through the resistor 324 is shorted to ground through the transistor 314. Thus, there is no longer any base drive current for the transistor 268 and it is rendered non-conductive to inhibit motor operation until the capacitor 306 discharges to again allow FET 310 to become conductive.

For example, with the resistor 308 having a value of about 3.3 Megohm and with the capacitor 306 having a value of about 50 microfarads, the capacitor 306 will hold the FET 310 off for about five minutes. Proper selection of capacitor 306 and resistor 308 allows for a wide selection of time delay values. The resistor 304 is also in the discharge path of capacitor 306 but this resistance can be ignored since it is small in relation to resistor 308 for the voltage divider of the resistances 302 and 304 to be effective. Also, the leakage of discharge current through the FET 310 can be ignored due to the high resistance of the back biased gate to channel junction of the FET 310.

In order to ensure that the full five minutes time delay is experienced before motor restart is allowed, the diode 318 is included. If the FET 310 is turned off, the transistor 314 is driven into saturation and the collector of transistor 314 is pulled close to ground. The diode 318 insures that as long as the transistor 314 is in saturation, the voltage at the junction 307 is held close to ground. Thus, the voltage at junction 307 is not allowed to return high until the capacitor 306 has discharged. Once the voltage at the gate of the FET 310 becomes close to ground, for example above about −3 volts, the FET 310 again becomes conductive, thereby turning off the transistor 314 and allowing motor operation again. The diode 318 prevents positive current flow from resistor 316 to junction 307.

Either upon initial startup or upon motor re-start, the capacitor 306 is charged by current through the resistance 296, which has been rendered conductive.

Because the gate to channel junction of FET 310 is rendered forwardly biased when the junction 307 goes high, current through the gate-source of the FET 310 bypasses the resistance 308 allowing the capacitor to be charged rapidly compared to its discharge time. If the power to the motor and to this circuit should be interrupted for more than the time necessary for the capacitor to discharge, the motor can be readily restarted with the return of power. If power is returned to the circuit before the capacitor 308 discharges, the charge on the capacitor 306 maintains the gate of the FET 310 negative holding FET nonconductive to allow transistor 314 to conduct shunting the junction 322 to ground to turn transistor 326 off, thereby ensuring that the full time delay will be experienced.

Shown in FIG. 3 is a variation of one part of the time delay circuit of FIG. 2, showing an alternative connection of the light sensitive resistance 296 to the circuit. In this embodiment, the neon lamp 292 is connected as in FIG. 2 with one side connected through the current limiting resistance 294 to the terminal 122 and the other side connected directly to the terminal 126. The light-sensitive resistance 296 in FIG. 3 is connected at one end to the ground 290 and at its other end to a resistor 328. The resistor 328 is in series with another resistor 330 which is connected to the DC voltage node 288. Connected in parallel across the series connection of the resistors 328 and 330 is an integrating capacitor 332. The junction of the resistors 328 and 330 is also connected to the base of a bipolar junction PNP transistor 334 which has its emitter connected to the node 288. The collector of the transistor 334 is connected to one end of a resistor 336, the other end of which connects to the circuit junction 307. The zener diode 300 and the voltage divider resistors 302 and 304 are connected as in FIG. 2.

This variation of FIG. 3 serves to correct high temperature false triggering problems in the time delay circuit. The time response of the light sensitive resistance 296 becomes faster at high temperatures and at times tends to follow the flickering characteristic of the neon lamp 292 due to A.C. excitation, spurious power signals, or the like, to produce negative going spikes which in the circuit of FIG. 2 may cause false triggering. When the light sensitive resistance 296 is in its highly conductive state, current flows through the resistors 328 and 330, thereby lowering the voltage at the base of the transistor 334 and driving it into conduction. With the transistor 334 conductive, current flows through the resistor 336, which is selected to have a lower value than resistor 302, thereby raising the voltage at the circuit junction 307 to about 12 volts. Conversely, when the resistance 296 is in its high resistive state, the transistor 334 is rendered non-conductive and the junction 307 is low. The capacitor 332 serves to smooth out the fast response of the light sensitive resistance 296 by delaying the response of the voltage across the resistors 328 and 330. Thus, the capacitor 332 is selected to be large enough to filter out or bypass the fast response pulses of the resistance 296 to allow the transistor 334 to become conductive only if the resistance 296 is rendered in its high conductive state by a true turn off of lamp 292.

Since many modifications, variations and changes in detail may be made to the above described embodiment, it is intended that all matter in the foregoing description and accompanying drawings be interpreted in an illustrative and not a limiting sense.

What is claimed is:

1. A control circuit to prevent reenergization of a load for a predetermined time comprising
    means including a first semiconductor switching device for controlling energization of the load,
    a second semiconductor switching device having conductive and non-conductive states and connected to control said first switching device to deenergize the load when said second switching device is conductive,
    a field effect transistor connected to control the operation of said second switching device,
    a circuit junction,
    a capacitor having a first side connected to the gate of said field effect transistor and a second side connected to the circuit junction,
    a resistance connected across said capacitor,
    condition responsive means connected to the circuit junction for lowering the voltage at the circuit junction to turn off said field effect transistor, and
    a diode having its anode connected to the circuit junction and its cathode connected to said second switching device for holding the voltage at the circuit junction at a low voltage until the voltage on the first side of said capacitor is raised sufficiently to turn on said field effect transistor.

2. A control circuit as claimed in claim 1, wherein said first switching device is a first bipolar junction transistor having its base current controlled by the state of said second switching device.

3. A control circuit as claimed in claim 2, wherein said second switching device is a second bipolar junction transistor.

4. A control circuit as claimed in claim 3, wherein there is a current node connected respectively to a source of voltage through a resistor, to the base of said first bipolar junction transistor through a first diode and to the collector of said second bipolar junction transistor through a second diode, so that current from said resistor flows either to the base of said first bipolar junction transistor or to the collector of said second bipolar junction transistor depending on the conductive state of said second bipolar junction transistor.

5. A control circuit as claimed in claim 1, wherein said voltage lowering means includes a condition controlled resistance connected to a source of DC voltage and having a high and a low conductive state.

6. A control circuit as claimed in claim 5, wherein said condition controlled resistance is a light-sensitive resistance and there is a source of light located proximate to said light-sensitive resistance and responsive to the energization of the load to drive said light-sensitive resistance to its high conductive state.

7. A control circuit as claimed in claim 6, wherein there is a voltage divider connected to the circuit junction to hold the circuit junction at a low voltage when said light-sensitive resistance is in its low conductive state.

8. A control circuit as claimed in claim 7, wherein there is a zener diode connected to the circuit junction to limit the voltage at the circuit junction to a preselected maximum value.

9. A motor control circuit comprising
    a power switching circuit capable of energizing a motor;
    a first transistor controlling operation of said power switching circuit;
    a plurality of condition sensing amplifiers;
    an OR-circuit connecting said condition sensing amplifiers to said first transistor so that any one of said condition sensing amplifiers can operate said first transistor;
    a pair of terminals including a ground and a DC power terminal;
    a second transistor connected in series between said first transistor and said power switching circuit;

a current node;

a resistor connecting the current node to a source of DC voltage;

a first diode connecting said current node to the base of said second transistor;

a third transistor;

a second diode connecting said current node to the collector of said third transistor;

a field effect transistor connected to the base of said third transistor to control its operation;

a capacitor having two plates, one plate being connected to the gate of said field effect transistor;

a circuit junction connected to the other plate of said capacitor;

a resistive voltage divider connected to the voltage and ground terminals and to the circuit junction, said voltage divider tending to hold the circuit junction at a low voltage;

a resistive discharge path for said capacitor;

a light-sensitive resistance connected to the circuit junction and having a high and low conductive state and operable in said high conductive state to charge said capacitor through said circuit junction by raising the voltage at the circuit junction;

a neon lamp disposed in proximity to said light sensitive resistance so as to control its state, the lamp being operable in response to the operation of said power switching circuit; and a diode connected between the circuit junction and the collector of said third transistor to hold the voltage low at the circuit junction as long as said third transistor is conducting to allow said capacitor to discharge through said discharge means.

10. A motor control circuit as claimed in claim 9 wherein the field effect transistor is a junction field effect transistor with its gate and source connected across at least a portion of the resistive discharge path such the gate-channel junction of the field effect transistor is rendered conductive to at least partially bypass the resistive discharge path when the circuit junction is high to allow rapid recharge of the capacitor.

11. A motor control circuit as claimed in claim 9 wherein the power switching circuit is an AC power circuit, the neon lamp is energized by AC power when the power switching circuit is operated, and there is included filter means for preventing false trigger signals from the light sensitive resistance.

* * * * *